United States Patent [19]

Barbini

[11] 4,111,402

[45] Sep. 5, 1978

[54] MOTIONLESS MIXER

[75] Inventor: Richard J. Barbini, Central Islip, N.Y.

[73] Assignee: Chemineer, Inc., Dayton, Ohio

[21] Appl. No.: 729,725

[22] Filed: Oct. 5, 1976

[51] Int. Cl.[2] .............................................. B01J 13/10

[52] U.S. Cl. ...................................... 366/338; 138/38; 29/157.3 AH; 165/109; 165/145; 425/204

[58] Field of Search ................ 259/4 R, 4 AB, 4 AC, 259/16, 18, ; 138/38, 42, 114, 122; 29/157 R, 455 R, 456, 157.3 B, 157.3 AH; 165/109, 141, 145; 425/133.1, 204, 209

[56] References Cited

U.S. PATENT DOCUMENTS

| | | | |
|---|---|---|---|
| 979,762 | 12/1910 | Hildebrandt | 138/114 |
| 1,813,122 | 7/1931 | Moore | 138/43 X |
| 2,115,769 | 5/1938 | Harris | 138/38 X |
| 2,740,616 | 4/1956 | Walden | 259/4 AB |
| 2,832,374 | 4/1958 | November | 138/111 |
| 3,216,705 | 11/1965 | Struck | 259/4 R |
| 3,427,003 | 2/1969 | Schneider | 425/204 |
| 3,835,886 | 9/1974 | Zajas | 259/4 AB X |
| 3,871,624 | 3/1975 | Huher | 259/4 AB |

FOREIGN PATENT DOCUMENTS

| | | | |
|---|---|---|---|
| 848,653 | 9/1960 | United Kingdom | 425/209 |
| 734,182 | 7/1955 | United Kingdom | 425/204 |

*Primary Examiner*—Herbert F. Ross

[57] ABSTRACT

A motionless mixer for combining different substances brought into communication therewith. The mixer includes at least two tubular members. Each tubular member has at least one spiral corrugated surface thereon. The members are arranged so that different substances brought into and out of communication therewith including the at least one corrugated surface will be mixed together.

10 Claims, 10 Drawing Figures

FIG. 1
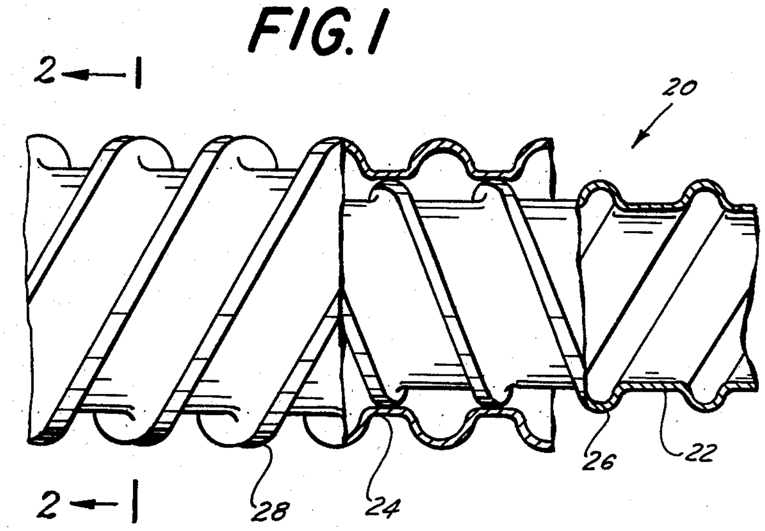
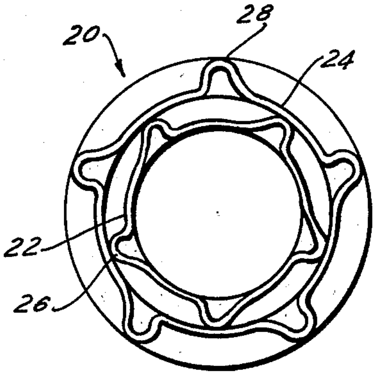
FIG. 2
FIG. 3
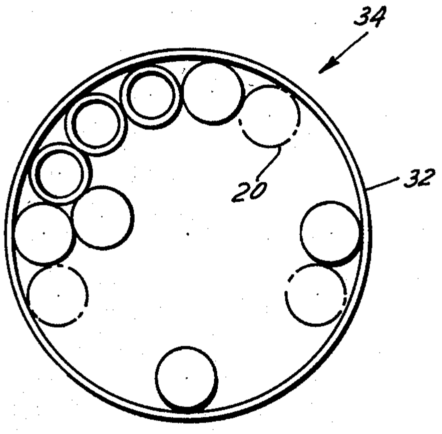
FIG. 4
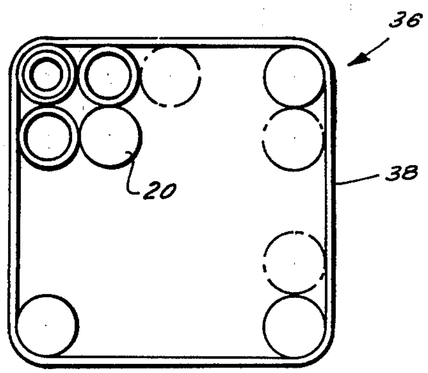

FIG. 5
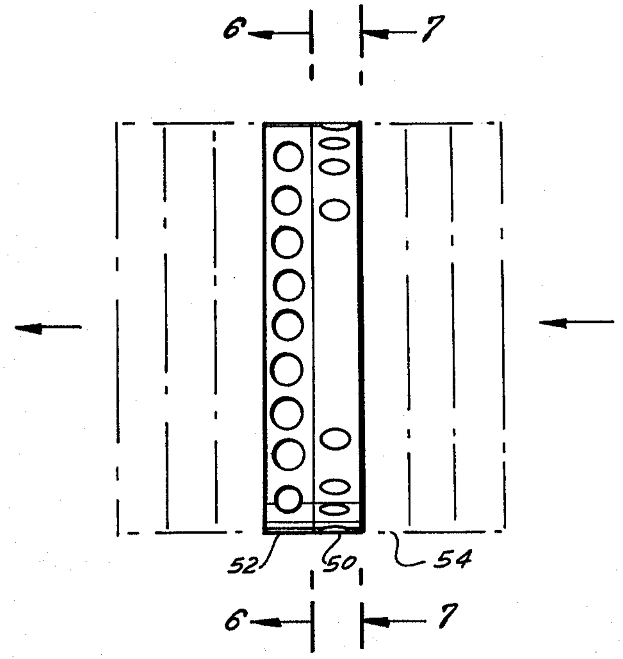
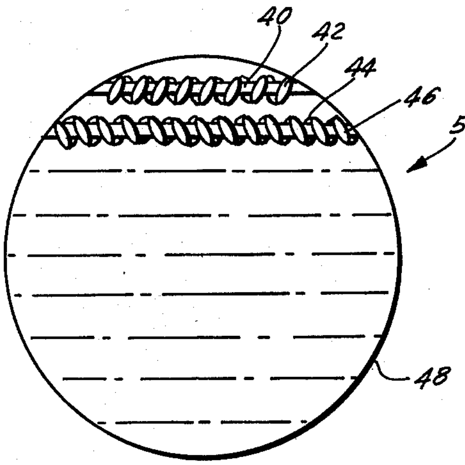
FIG. 6
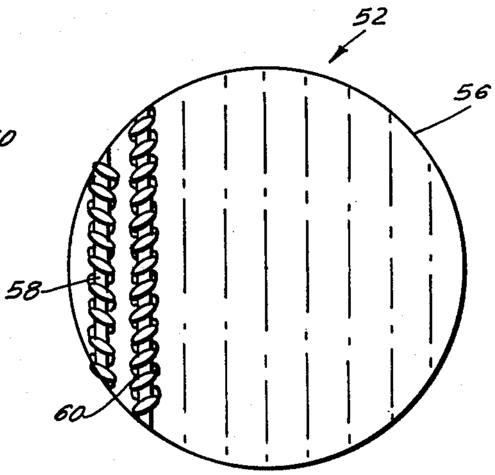
FIG. 7

FIG. 8
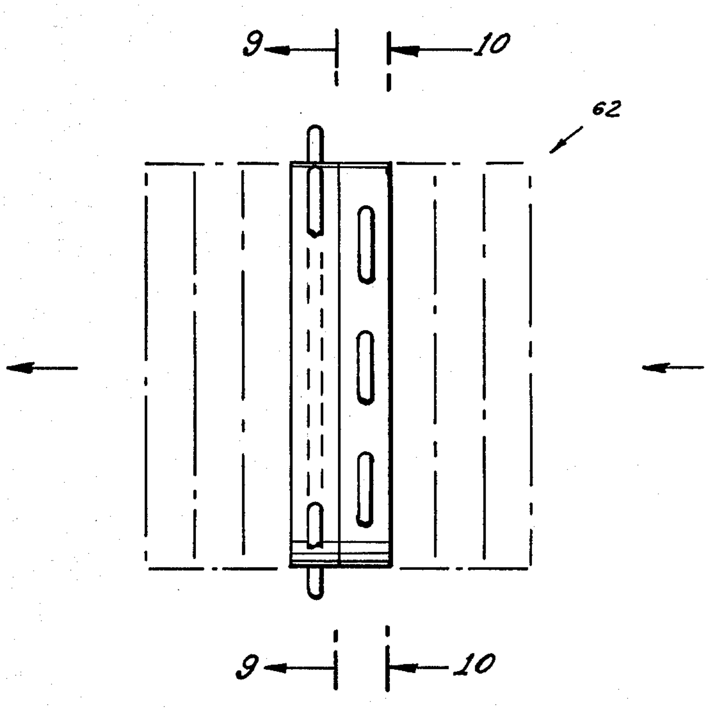
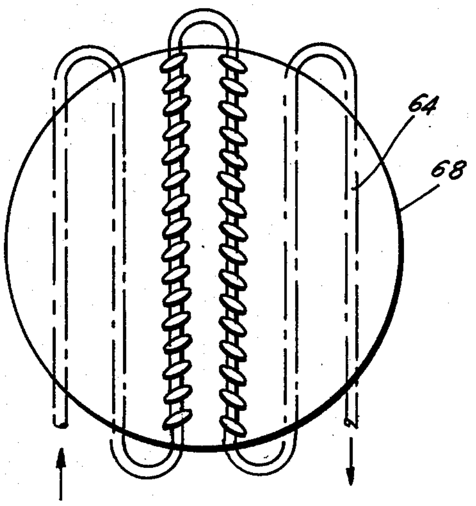
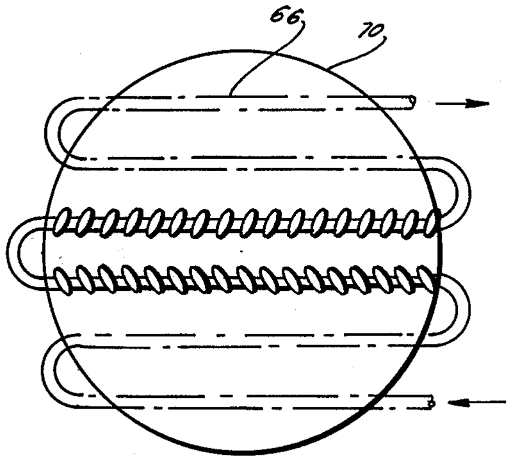
FIG. 9
FIG. 10

MOTIONLESS MIXER

BACKGROUND OF THE INVENTION

For many years mixing of substances such as gases, liquids, solids or a combination of two or more of these substances was accomplished by mechanically driven mixers. These types of devices which are complex in structure and require many mechanical parts are often expensive, and difficult to operate and keep in good repair. Additionally, they often require a greater amount of space in which to operate, and occasionally have to be operated on a non-continuous basis. They tend to be slow in operation, in general are not as precise as one would desire, and occasionally foul when handling difficult to mix materials. Other problems that occur are loss of materials being mixed and problems created by high shear forces.

It should also be kept in mind that mechanical systems are not closed systems since they require frequent maintenance and repair. They also require a large capital investment particularly in certain environments. It also should be noted that they require slower mixing times and need a high energy source to operate at any reasonable speed.

As a result, there has been recent development activity in static type mixers where the actual mixing structure is motionless and the materials to be mixed are passed over or through a structure whereby they are intermixed.

The various types of static mixers which have been developed leave room for improvement. They are often expensive to manufacture and operate. They utilize complex and tortuous paths which provide many baffles or surfaces against which the substances to be mixed are directed which can interfere with the most desirable uniform type of mixing process and create problems such as fouling, clogging or hang-up of materials. Examples of known systems are present in U.S. Pat. Nos. 3,916,504; 3,583,678; 3,785,620; 3,358,749; 3,404,869; 3,286,992 and 3,652,061. These references all disclose various types of static mixing devices and they rely upon various baffle type structures to buffet and change direction of fluid flow rather quickly. The result, as stated above, is a system whereby for all occasions the most consistent type of flow pattern does not result. Therefore, while these types of static mixers are an obvious improvement over the mechanical type of mixing devices where the mixer moves in contrast to the mediums being mixed, there is still room for further improvement in the operation and functioning of this type of mixer.

SUMMARY OF THE INVENTION

With the above background in mind, it is among the primary objectives of the present invention to provide a motionless or static mixer which creates a progressive mixing action usually independent of flow velocity of physical characteristics of the feed. The flow patterns created are consistent due to a continuous geometry of the mixing design. It is an objective of the present invention to provide a structure where there is a desired type of contact between the flowing substances and the surfaces causing the mixing action and the mixing occurs in a uniform and consistent manner throughout the system. There is minimal danger of any fouling or clogging in the structure and there is little danger of material wear with the present system. The structure provides an in-line, motionless, continuous process, which is precise, fast, repeatable, anti-fouling, low-loss, trouble-free, space saving and low shear in operation. It should also be kept in mind that there are no moving parts in the structure, no maintenance required, the system is a closed system, low capital investment and overall cost is required, fast mixing times are achieved and there is low energy requirement since there is no mechanical power source needed to drive the device. All that is required is that there be a source of power to pass the substances being mixed through the system.

In summary, a motionless mixer is provided for combining different substances which are brought into communication therewith. The mixer includes at least two tubular members with each tubular member having at least one spiral corrugated surface thereon. The members are arranged so that different substances brought into and out of communication therewith including the at least one corrugated surface will be mixed together.

The motionless mixer of the present application is usable in many environments including in a form where it is employed as at least one of a mixer, blender and contactor of substances such as liquids, gases, solids or any combination thereof. Environments in which the structure is designed for use in include mixing, blending, contacting, extractions, predictable droplet distributions, combining materials of drastic differences in viscosity combining materials of drastic differences in volume fraction, desuperheating, a heating/cooling process, chemical reactions, and heat transfer applications.

With the above objectives in mind, reference is made to the attached drawings.

BRIEF DESCRIPTION OF THE DRAWINGS

In the drawings:

FIG. 1 is a fragmentary side elevation view of a mixer element of the invention;

FIG. 2 is a sectional end view thereof taken along the plane of line 2—2 of FIG. 1;

FIG. 3 is an end plan view of a plurality of elements mounted in a circular bank;

FIG. 4 is a plurality of elements mounted in side by side relationship in a square bank;

FIG. 5 is a schematic representation of an alternative form of the mixer showing a plurality of banks of elements positioned in sequential arrangement with arrows showing the direction of flow of the substances to be mixed;

FIG. 6 is a sectional view thereof taken along the plane of line 6—6 of FIG. 5;

FIG. 7 is a sectional view thereof taken along the plane of line 7—7 of FIG. 5;

FIG. 8 is a schematic representation of a second alternative form of the device used as a heat transfer system with a plurality of circular banks of elements arranged in sequential form side by side with arrows showing the direction of flow of the material to be subjected to the temperature change;

FIG. 9 is a sectional view thereof taken along the plane of line 9—9 of FIG. 8; and FIG. 10 is a sectional view thereof taken along the plane of line 10—10 of FIG. 8.

DESCRIPTION OF THE PREFERRED EMBODIMENTS

The basic structure of the device when used as a mixer in the form of an element 20 is depicted in FIGS. 1 and 2. An inner tube 22 is concentrically mounted in an outer tube 24. The inner tube 22 has a helical spiral corrugated surface 26 wound in one direction and the outer tube 24 has a similar helical spiral corrugated surface 28 wound in the opposite direction. The spiral surfaces are formed in a well known manner such as described and depicted in U.S. Pat. Nos. 3,533,267; 3,730,229 and 3,777,343. In general the process can be described as one in which one end of the tube is held in fixed position and the other end is twisted so as to form the corrugated spirally convoluted surface.

By providing opposing spirals to the inner and outer tube an arrangement of passageways is provided whereby when fluid is introduced axially to the combination it will be subjected to twists and turns in a tortuous path and mixing of the substances will occur whether they are liquids, gases, solids or a combination thereof. While two corrugated tubes are depicted in FIG. 1, it is also possible to provide additional larger diameter or smaller diameter tubes of the same type to increase the cross sectional area and passageways through an individual element 20.

The elements 20 thus formed can be arranged in a number of different ways to act as a mixing structure. In one form, elements 20 can be arranged one behind the other in a series as long as desired for the mixing operation. To further enhance the tortuous flow path, each succeeding element 20 can be angularly oriented a predetermined amount with respect to the preceeding element. It has been found that an angular displacement of 90° is effective for this purpose.

As shown in FIGS. 3 and 4 there are other ways in which to mount elements 20 to achieve the desired mixing action. In FIG. 3 the elements 20 are housed in a circular housing 32 and are arranged in side by side relationship within the housing. The result is the formation of a bank 34. The banks 34 can be arranged in the same fashion as the individual elements were arranged as described above when used individually in linear sequence for passage of the substances to be mixed therethrough in an axial direction. The same is true for the bank 36 provided in FIG. 4. The only difference between this bank and the bank of FIG. 3 is in the shape of the housing. A square housing 38 is employed for the surrounding structure. The type of arrangement of the tubes of the embodiments of FIGS. 1–4 can be considered an internal stacking arrangement. As an alternative, it is also possible to provide holes between the threads of the tubes for additional lateral flow paths. The bank arrangements of FIGS. 3 and 4 are particularly useful for reactor internals and tower packings for, adsorption, extraction, ion exchange, and other mass and heat transfer processes.

An alternative set up is depicted in FIGS. 5–7 where the tubes are arranged in parallel side by side relationship which can be termed external stacking. As shown, the first tube 40 would have a helical corrugation 42 in one direction and the next adjacent tube 44 would have a helical corrugation 46 in the opposite direction. This would continue across the cross section of a housing 48 which is circular in configuration in the depicted form. The housed parallel tubes forming an element or bank 50 would be then positioned in sequence between two adjacent banks 52 and 54. A linear arrangement in sequence can be provided as long as desired in this fashion as shown in FIG. 5. It should be noted that the next adjacent bank 52 as shown in FIG. 7 has a similar shaped outer housing 56 however, it has the tubes 58 and 60 therein with opposite windings angularly rotated so that it is 90 degrees out of phase with the next adjacent element 50. This is true all along the entire line of the mixer made up of a plurality of banks such as banks 50 and 52. As shown the degree of angular orientation is 90°, however once again this is a matter of choice. The object is to provide a more tortuous path once again for flow of substances to be mixed in the axial direction as depicted by the arrows in FIG. 5. With external stacking the flow is generally directed normal to the longitudinal axis of each tube and passes over the corrugated surfaces thereon so that the desired mixing actin occurs.

FIGS. 8–10 show the tubing concept of the present invention utilized in a heat transfer environment as opposed to a strict mixing environment. The arrangement of elements forming a stack sequence 62 is similar to the stack sequence of the embodiment of FIGS. 5–7. However while the tubes are housed within circular housing as in the previous embodiment the tube structure and arrangement is somewhat different. The tube is in the form of a continuous serpentine 64 so that a heating or cooling fluid can pass in one end of the system and will travel the entire length and pass out of the other end as shown by the arrows in FIGS. 9 and 10. The serpentine arrangement 66 of FIG. 10 is identical to serpentine arrangement 64 of FIG. 9 with the exception that it is 90° out of phase, to enhance the heat transfer action. Serpentine 64 is mounted in a circular housing 68 and serpentine 66 is mounted in a similar circular housing 70. The parallel portions of the serpentine arrangement are spirally corrugated in the same manner as in the previous embodiments to provide the convuluted outer surface this time used for heat transfer purposes in contrast to the mixing purposes of the previous embodiments. Operation of the device is accomplished in the same manner with the substance to be subjected to the heating or cooling action passing axially through the sequential bank 62 as shown by the arrows in FIG. 8. This embodiment merely shows the adaptability of the external stacking arrangement of the tubing segments for heat transfer purposes in contrast to mixing purposes of the previous embodiments.

There are some further general considerations which are applicable when dealing with the internal stacking system. For example, in internal stacking, the concentric twisted tubes are arranged with each adjacent pair of tubes containing opposite twist. It should also be kept in mind that the contoured corrugations or threads may be touching or separate. As an option, holes of a predetermined geometry may be present between the twisted corrugations. Each element of a mixer, with the mixer being a one or a series of elements, will have some length to diameter ratio either constant or varying along the mixer. As described above, individual concentric groups may be grouped in banks.

Advantages of this type of mixer produced by internal stacking include a continuous contour existing along the twisted corrugations permitting no sharp crevices for material hang-up during process flow. During laminar flow interfacial surface generation is highly effective. A formula for calculating the number of interfacial layers is $N = (t-1)\, n2^n$. In the formula: $n$ = the number of threads per inch; $N$ = the number of layers per inch; $t$ = the number of concentric tubes.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. A motionless mixer for combining different substances put into communication therewith comprising; at least two tubular members, each tubular member having at least one spiral corrugated surface thereon, the members being arranged so that the longitudinal axes of adjacent tubular members either coincide or are parallel and the corrugated surfaces are stationary so that different substances brought into and out of communication therewith will be mixed together as the substances progress along the mixer in the direction of flow, adjacent said members touching each other at a predetermined number of points, and the spiral corrugated surfaces forming continuous contours to facilitate mixing of the substances.

2. The invention in accordance with claim 1 wherein the tubular members are concentrically arranged to form an element so that the substances to be mixed can be passes therebetween in a longitudinal direction.

3. The invention in accordance with claim 2 wherein there are a plurality of concentric corrugated tubular elements arranged end to end and angularly displaced with respect to the preceding element so as to provide a more tortuous mixing path for the substances passed axially through the successively arranged elements.

4. The invention in accordance with claim 1 wherein a plurality of concentric tubular arrangements in the form of elements are provided with the elements being mounted in adjacent lateral position with respect to one another within an outer housing so as to form a bank of filter elements for passage of the substances to be mixed therethrough.

5. The invention in accordance with claim 4 wherein a plurality of successive banks are provided in axial alignment so that the substances can pass through the plurality of banks in sequence.

6. The invention in accordance with claim 4 wherein the housing is circular in configuration.

7. The invention in accordance with claim 4 wherein the housing is square in configuration.

8. The invention in accordance with claim 1 wherein the corrugated surfaces on adjacent concentric members are spirally wound in opposite directions.

9. The invention in accordance with claim 3 wherein the angular displacement with respect to the preceding element is 90°.

10. The invention in accordance with claim 1 wherein the spiral surface on each member is on the exterior surface thereof and the members are arranged in side by side parallel relationship for passage of the substances to be mixed across the corrugated exterior surfaces thereof to mix the substances together.

* * * * *